(12) United States Patent
Falk

(10) Patent No.: US 7,672,149 B2
(45) Date of Patent: Mar. 2, 2010

(54) DEVICE FOR FEEDING ELECTRICAL ENERGY FROM AN ENERGY SOURCE

(75) Inventor: Andreas Falk, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 202 days.

(21) Appl. No.: 11/890,694

(22) Filed: Aug. 7, 2007

(65) Prior Publication Data

US 2008/0192510 A1    Aug. 14, 2008

(30) Foreign Application Priority Data

Feb. 8, 2007    (EP) ................... 07002682

(51) Int. Cl.
*H02M 3/335* (2006.01)
*H02M 7/5387* (2007.01)

(52) U.S. Cl. .............. 363/98; 363/21.02; 363/49

(58) Field of Classification Search .......... 363/15, 363/16, 17, 21.03, 98, 132, 49, 21.02
See application file for complete search history.

(56) References Cited

U.S. PATENT DOCUMENTS

| | | | |
|---|---|---|---|
| 5,231,563 A * | 7/1993 | Jitaru | ........................ 363/98 |
| 5,717,582 A | 2/1998 | Duong | |
| 5,736,842 A * | 4/1998 | Jovanovic | ................. 323/222 |
| 6,031,747 A | 2/2000 | Ilic et al. | |
| 7,167,383 B2 * | 1/2007 | Iwakura et al. | ............. 363/89 |
| 2004/0125618 A1 | 7/2004 | De Rooij et al. | |

FOREIGN PATENT DOCUMENTS

| | | |
|---|---|---|
| DE | 199 37 410 A1 | 2/2001 |
| DE | 10 2005 023 291 A1 | 11/2006 |
| EP | 1 458 084 A2 | 9/2004 |

* cited by examiner

*Primary Examiner*—Gary L Laxton
(74) *Attorney, Agent, or Firm*—Thomas R. Vigil

(57) ABSTRACT

A device (1) for feeding electrical energy from an energy source with variable source voltage into an electric power supply network (15), said device (1) including a transformer (112) for galvanic isolation, a resonant inverter (11) with semi-conductor switches (a-d; A, B), one or several resonant capacitors (17; 18, 19; 20, 21) and one rectifier (113), is intended to provide high efficiency and have galvanic isolation. This is achieved in that the resonant inverter (11) is operated in the full resonant mode if the operating voltage is in an operation point (MPP) and in the hard-switching mode if the voltages exceed the operation point (MPP).

23 Claims, 4 Drawing Sheets

DEVICE FOR FEEDING ELECTRICAL ENERGY FROM AN ENERGY SOURCE

CROSS-REFERENCE TO RELATED APPLICATIONS

Figure 1:
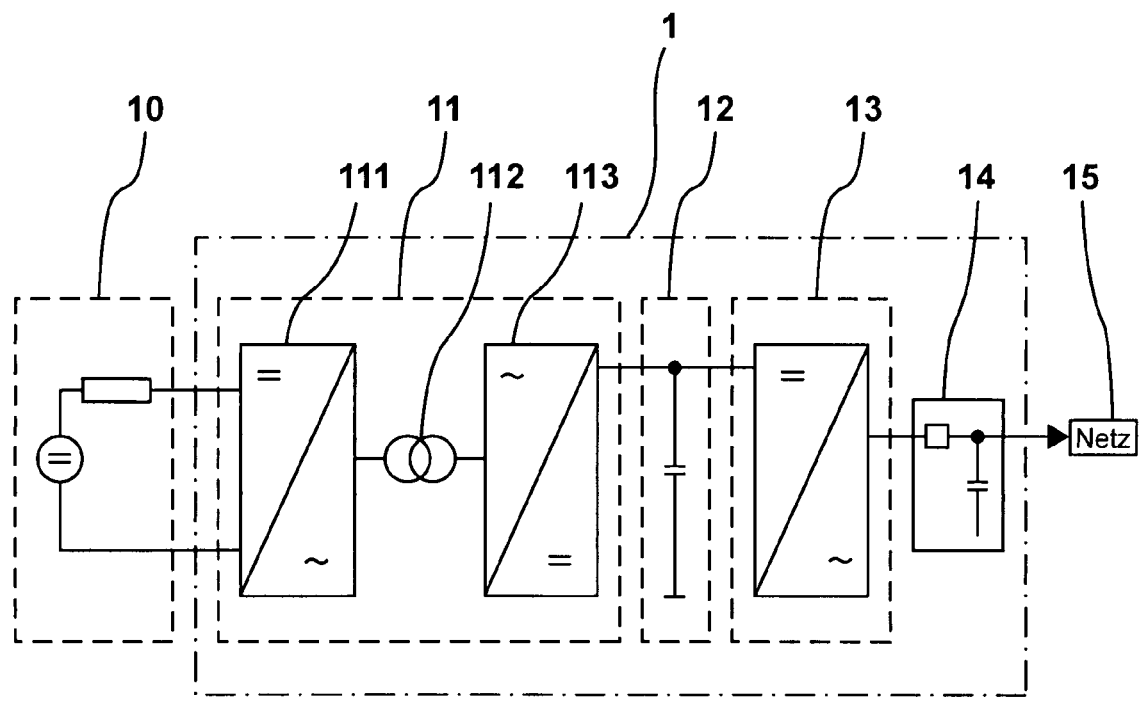

This application claims Priority from European Application No. EP 07002682.8 filed on Feb. 8, 2007.

FIELD OF THE INVENTION

A device for feeding electrical energy from an energy source with variable source voltage into an electric power supply network, said device including a transformer for galvanic isolation, a resonant inverter with semi-conductor switches, one or several resonant capacitors and one rectifier. Many electrical energy sources, more specifically solar generators, wind power plants with what are termed PM generators, speed-variable combustion motors, fuel cells, batteries and the like, often have a highly variable voltage and quite high an inner impedance. Usually, such energy sources are direct voltage sources but energy sources having a one-phase or a three-phase alternating voltage with variable frequency may also have a highly variable source voltage.

An adapter device is needed to feed electrical energy from such sources into a power supply device. For the electrical energy provided by a solar generator, solar inverters are known that are specially adapted to the characteristics of solar or photovoltaic cells. The energy supply device may be a public mains or an island network for one or several consumers or rather for quite a few consumers.

An adapter device of the type mentioned has several functions.

On the one side, it is intended to adapt voltage generated and frequency delivered to the conditions in the energy supply device which is to be fed. On the other side, the best possible power output is intended to be achieved for the energy source. With solar generators, optimal so-called MPP control (Maximum Operation point or power output at maximum efficiency) is to be used for obtaining the highest possible energy. Furthermore, all the safety requirements have to be observed and met when feeding in accordance with the actual standards and the valid rules of the art.

If high efficiency is achieved, the operating efficiency of the adapter device is improved and the heat loss of the plant reduced, which leads to less thermal problems. In many cases, it is necessary to galvanically isolate the energy source from the supply network because of technical requirements and of country-specific rules and standards. As a rule, an adapter device with galvanic isolation is less efficient than an adapter device without galvanic isolation.

DESCRIPTION OF THE PRIOR ART

Adapter devices with galvanic isolation are known that are implemented as one-phase or three-phase inverters having a low-frequency transformer or a high-frequency transformer.

In the first variant, an energy source with a high internal resistance is mounted downstream of a one-phase or three-phase inverter. If the energy source is a direct voltage source, a solar generator in particular, or a fuel cell, the inverter may be connected directly. In the case of alternating voltage sources, of wind or water power plants having a PM generator, a rectifier must be mounted therein between. Usually, the inverter is implemented as an H-bridge in one-phase plants or as a three-phase bridge in three-phase plants.

As a rule, a sinus filter and a transformer are mounted downstream of the inverter. The power supply device is connected to the secondary side of the transformer. Such a device has long been known.

In the variant having a low-frequency transformer, the transformer's transformation ratio must be chosen such that electrical energy may still be fed even if the voltage at the energy source is low or minimum and the mains voltage at its maximum. The minimum voltage occurs in particular with a solar generator when irradiation is at its maximum and, as a result thereof, if the current and the ambient temperature are high. As a result, the current on the primary side of the transformer may be very high. The semi-conductor switches of the low frequency inverter must be devised for this high current on the one side and on the other side also for the maximum voltage of the energy source. Due to the switching losses in the semi-conductor switches of the low-frequency inverter, the losses increase with rising voltage at the energy source.

The variant with the low-frequency transformer further suffers from other disadvantages.

The low-frequency transformer is of quite large dimensions and is very heavy. This variant works with high currents on the primary side of the transformer because the transformation ratio must be adapted to the case of the minimum voltage at the power source and of maximum voltage in the power supply network. Furthermore, the semi-conductor losses increase with rising voltage at the energy source. Another advantage is that the higher the maximum admissible off-state voltage of the semi-conductors, the higher the on-state and switching losses, this resulting in a small efficiency of the adapter device.

In the second variant having a high-frequency transformer, a high-frequency inverter (HF-inverter) is mounted downstream of an energy source with quite high an internal resistance. If the energy source is a direct voltage source, more specifically if it is a solar generator or a fuel cell, the high-frequency inverter may be connected directly. In alternating voltage sources such as wind or water power plants having a PM generator, a rectifier must be mounted therein between.

The high-frequency inverter generates a high-frequency alternating voltage the high-frequency transformer transforms to the secondary side thereof. There, the alternating voltage is rectified with a diode rectifier.

The rectifier feeds a direct voltage intermediate circuit. A low-frequency inverter (LF inverter) is mounted downstream of the direct voltage intermediate circuit in the form of an H-bridge in one-phase plants or in the form of a three-phase bridge in three-phase plants. The supply network is connected to the low-frequency inverter through a sinus filter.

Because the energy source comprises a strongly variable voltage in the cases described herein, an adapter must often be connected between the energy source and the high-frequency inverter in order to keep the direct voltage intermediate circuit stable on the secondary side. This is particularly the case if the high-frequency inverter is configured to be a resonance converter. Although resonance converters are highly efficient, they cannot be utilized for adapting the voltage.

The document EP 1 458 084 A2 explains a device with a resonant switching high-frequency inverter. A resonant DC-DC converter having a high-frequency transformer is used. An input direct voltage, which may more specifically be made available by a solar generator, is converted to alternating voltage through a full bridge and transformed by the high-frequency transformer. On the secondary side, there also is a full bridge that is implemented for the converter to be operable on both directions. An additional inductance and an additional capacitor, which are connected in series to the secondary winding of the high-frequency transformer, form a resonant circuit.

Since the output voltage of the solar generator is subjected to strong fluctuations whilst a stable voltage is to be available behind the rectifier in the direct voltage intermediate circuit, an additional adapter stage must be provided in practice. This adapter stage may be disposed before or behind the DC-DC converter. It may be implemented as a boost chopper or as a buck chopper.

Another device is known from the German Patent Application Publication DE 10 2005 023 291 A1. This device includes such an adapter device. The adapter device consists of a resonant converter with galvanic isolation and of a boost chopper mounted upstream thereof. Such an adapter stage however causes additional costs and requires additional space. Furthermore, additional losses are originated in such a stage. Accordingly, this not only makes it necessary to provide for an additional adapter stage, which involves more components, more costs and more space, but also suffers from the serious disadvantage that the efficiency is reduced by such an additional stage.

Not only devices with resonant switching high-frequency inverters are known, but also such with hard-switching high-frequency inverters.

If a high-frequency inverter is configured to be a hard-switching inverter, it may be utilized for performing the required voltage adapter but suffers from the disadvantage that it has poor efficiency.

The German Patent Application Publication DE 199 37 410 A1 shows and describes a variant having a hard-switching high-frequency inverter. A direct voltage source configured to be a solar module and having a buffer capacitor is adjoined with a full bridge converting the direct voltage into alternating voltage. Through a high-frequency transformer, this alternating voltage is transformed on the secondary side. The output voltage of the transformer is rectified, an intermediate circuit capacitor mounted downstream thereof being charged. An adjoining three-phase inverter generates an approximately sinusoidal output voltage that corresponds in amplitude and frequency to the mains voltage.

The transformer's transformation ratio of the high-frequency transformer must be chosen such that electrical energy can be fed even if the voltage at the energy source is at its lowest and the mains voltage at its highest. This voltage occurs in particular in a solar generator when the irradiation is at its highest and when the ambient temperature is high. As a result, the primary side current of the high-frequency transformer is very high. The semi-conductor switches of the high-frequency inverter must be devised for these high currents. Concurrently, the semi-conductor switches must be devised for maximum voltage of the energy source. Due to the switching losses in the semi-conductor switches of the high-frequency inverter, the losses increase with rising voltage at the energy source.

The solution according to the printed document DE 199 37 410 A1 is disadvantageously characterized by high currents on the primary side of the high-frequency transformer, with the semi-conductor losses increasing with rising voltage at the energy source. It must be taken into consideration that the higher the highest admissible off-state voltage, the higher the on-state and switching losses.

The inconvenient of this solution is that there are considerable semi-conductor losses resulting from the hard-switching operation because in this operation point high switching losses are generated in the high-performance semi-conductors. This results in a small efficiency of the adapter device.

BRIEF SUMMARY OF THE INVENTION

It is the object of the invention to provide a highly efficient adapter device for feeding electrical energy from an energy source with variable source voltage into an electric power supply network, the device including a transformer for galvanic isolation, a resonant inverter with semi-conductor switches, one or several resonant capacitors and one rectifier, the resonant inverter being operated in the full resonant mode if the operating voltage is in an operation point, (MPP) and in the hard switching mode if the voltages exceed the operation point (MPP).

Further, the number of semi-conductor switches through which current flows should be the smallest possible, a resonant-switching high-frequency inverter being intended to be used without need for an additional adapter stage.

The solution to this object is achieved in that the resonance inverter is fully resonant when the operating voltage is in an operation point (MPP) and is operated so as to be hard-switching with voltages above the operation point (MPP).

The solution of the invention offers galvanic isolation between the energy source and the supply network while achieving very high efficiency at low cost. It combines the advantages of a resonant inverter with those of a hard-switching inverter, namely small switching losses, without the need for an adapter stage such as a boost chopper or a buck chopper.

For the control of the invention there is provided a control means, more specifically a microprocessor.

The invention relies on the observation that, although the losses in the resonant inverter in the hard-switching operation mode are significantly higher than in the fully resonant operation mode, this drawback can be tolerated since the operation point in a hard-switching resonant converter is very limited in time and only occurs in the start-up phase in which the energy source is not loaded. As a result, one generally obtains a very good efficiency without any additional adapter stage.

Galvanic isolation makes it possible to readily comply with standards and regulations.

Accordingly, the resonant converter utilized has a very advantageous efficiency so that the invention may totally obviate the need for an additional adapter stage by operating the resonant converter in the fully resonant operation mode in the maximum operation point, i.e., in the resonant point and by operating it in the hard-switching mode when the voltages exceed a voltage of the energy source associated with this operation point. As a result, the switching losses generally drop and the efficiency of the device is improved.

The invention has a particularly favourable impact on generators having high internal impedance. Here, efficiency can be considerably improved without adapter stage. An implementation as a solar inverter is particularly beneficial.

In an advantageous developed implementation of the invention, there is provided that, in the operation point (MPP), the semi-conductor switches of the resonant inverter are operated with a duty cycle that is more than half a period of the resonance frequency of an oscillating circuit. The oscillating circuit consists of the resonant capacitor(s) and of a transformer leakage inductance. Operation occurs at pulse widths ranging between 30 and 50% of the period of the pulse frequency so that a voltage at an intermediate circuit capacitor will not fall below a minimum value needed for feeding the network. This also applies when the operation point, more specifically the MPP voltage of the energy source, adopts a minimum value imposed by the device. Advantageously, when the voltages of the energy source are higher than the MPP voltage, the device is operated with pulse widths ranging between 0 and 50% so that the voltage at the intermediate circuit capacitor will not exceed a maximum value given by the electric strength of the semi-conductor switches of the regen-capable inverter, even if the voltage of the energy source is higher than the MPP voltage. In normal operation (MPP operation), this provision allows obtaining a current made from low-loss sinusoidal half-waves. Semi-conductor switches having quite small off-state strength may be utilized.

If semi-conductor switches of the same electric strength are used in the resonant inverter or resonant converter, which in principle is a DC/AC converter, and in the regen-capable inverter, which also is a DC/AC converter, the manufacturing costs are reduced by using components of the same type.

It is particularly advantageous if, in hard-switching operation above the operation point, a transformer current of the transformer consists of sine-wave portions. Although this causes switch-off losses to occur, it does not generate switch-on losses in the inverter.

Advantages of high-frequency inverters may be utilized if a high-frequency inverter is mounted upstream of the transformer, the high-frequency inverter being part of the resonant inverter or forming it. The high-frequency inverter comprises the semi-conductor switches for converting the direct voltage of the energy source into a high-frequency voltage. The switches are more specifically implemented as MOS transistors, IGBTs, GTOs.

In order to minimize the switching losses in the semi-conductor switches of the resonant converter as compared to hard-switching operation, it is beneficial if the resonant inverter, the transformer and the inverter form a resonant converter or a unit (DC/DC unit), the natural frequency formed by one or more resonant capacitors and a leakage inductance of the transformer being higher than a switching frequency of the resonant inverter. This is to say that a high-frequency inverter, the transformer and the rectifier form a resonant converter. This switching frequency is provided in order to minimize the switching losses in the semi-conductor switches (a-d; A, B) of the resonant converter as compared to a hard-switching mode of operation.

In an advantageous implementation of the invention, a high-frequency transformer is utilized instead of a low-frequency transformer.

The inverter is very light-weighted and has small dimensions if the high-frequency inverter is provided with the high-frequency transformer and a high-frequency rectifier.

According to another preferred embodiment of the apparatus of the invention, it is intended to reduce the ripple current loads in the energy source and in the intermediate circuit capacitor. This is achieved in that several resonant inverters are connected in parallel at the energy source on the primary side and are connected to a common intermediate circuit capacitor on the secondary side, the various resonant converters being clocked at different times.

A system having a device the energy source of which is a solar generator is particularly favourable. Said generator has quite high internal impedance but also quite high no-load voltage by virtue of the typical characteristic line of the solar cell. The invention may however also be utilized to advantage if the energy source is a fuel cell, a battery, a wind power plant with permanent-magnet generator, a combustion engine with a permanent-magnet generator or a water power plant with a permanent-magnet generator (PM-generator). These sources may also have a strongly varying voltage and high internal impedance.

Since solar generators may achieve quite high no-load voltage and since they are always to be operated in the MPP, it is very advantageous if the energy source is a photovoltaic solar generator having at least one MPP of a solar generator characteristic line, the resonant inverter being operated in the fully resonant mode in the MPP and in the hard-switching mode if the voltages are higher than the MPP. The off-state voltage of the semi-conductor switches can be significantly reduced. The MPP is also variable, such as because of the temperature fluctuations in the solar generator within one day.

Other advantageous embodiments of the invention are recited in the dependent claims.

The invention and other advantages thereof will be better understood when reading the following description of the figures.

BRIEF DESCRIPTION OF THE SEVERAL VIES OF THE DRAWING

Figure 2:
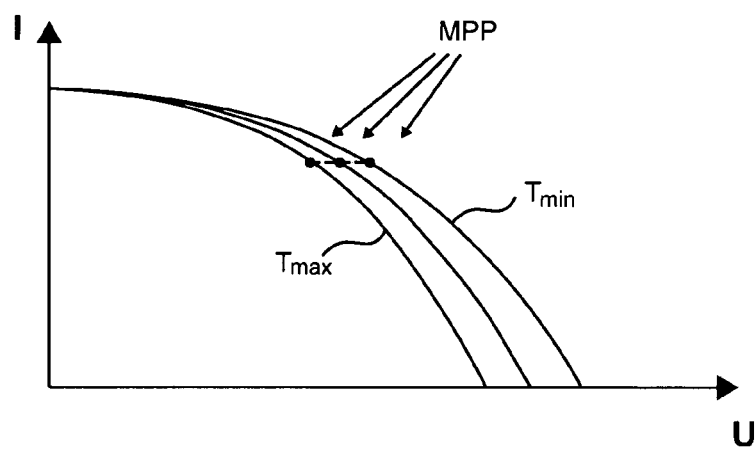
Figure 3:
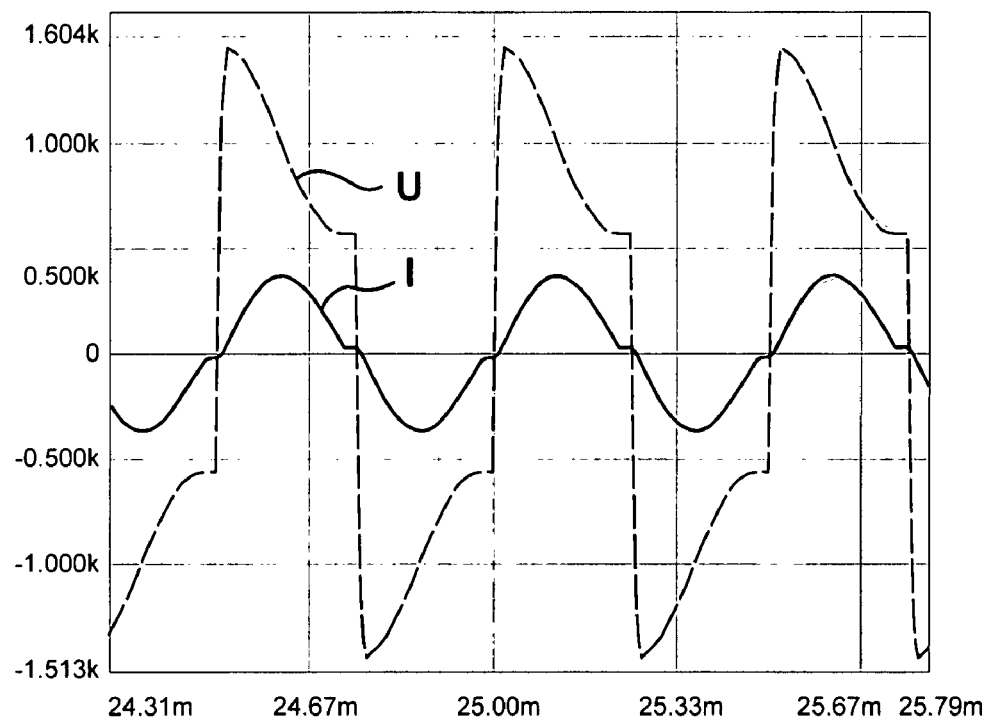
Figure 4:
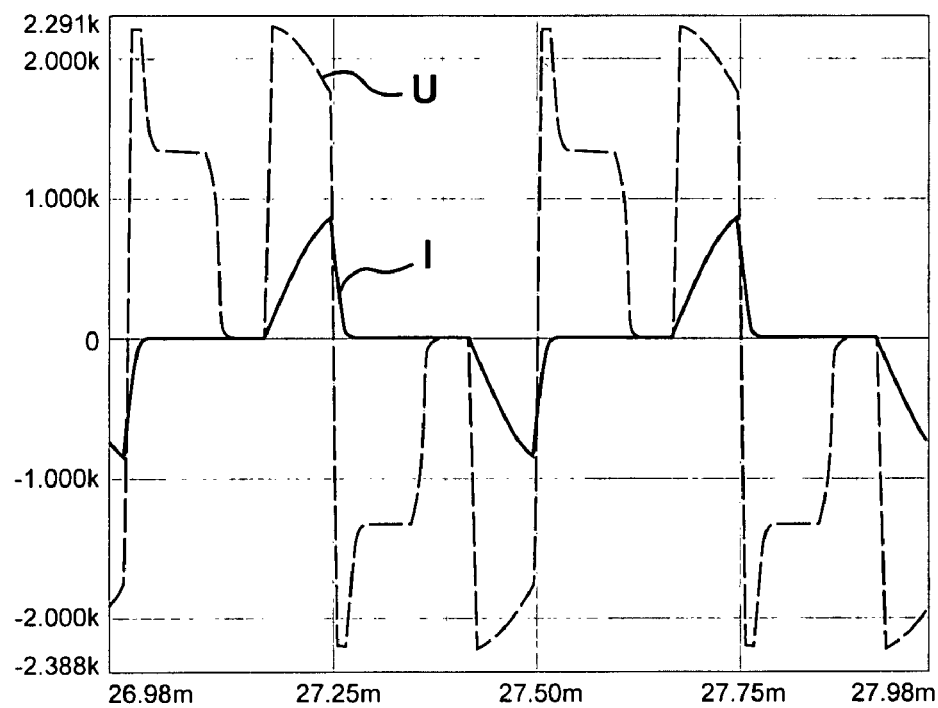
Figure 5:
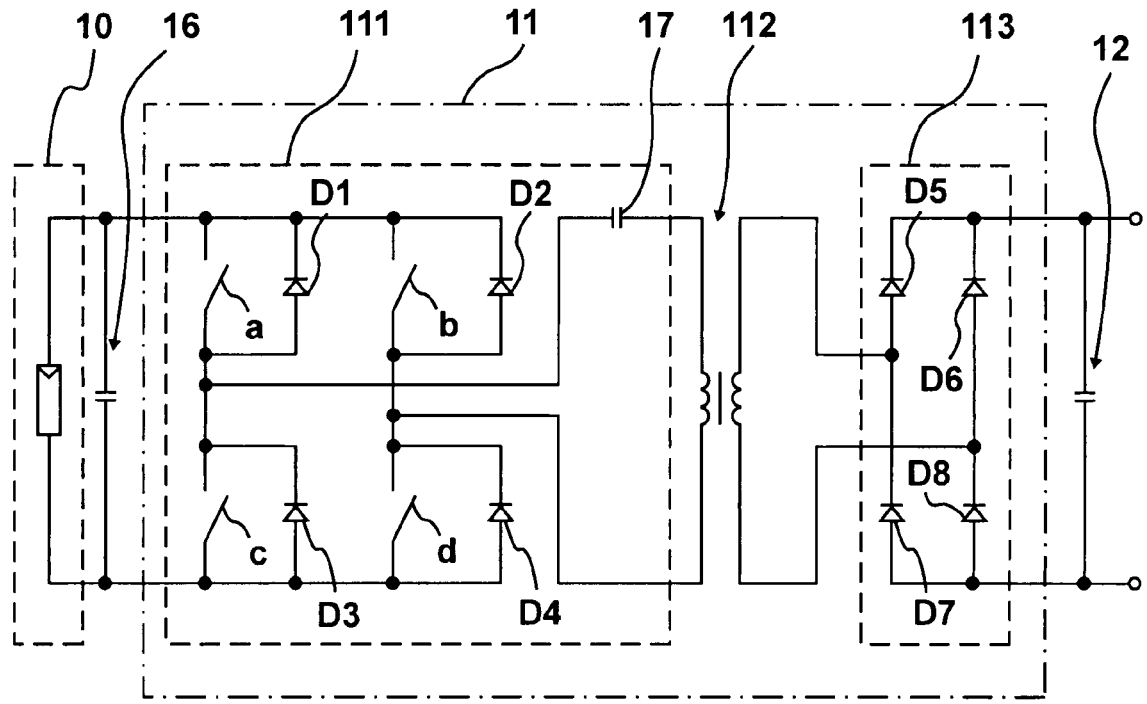
Figure 6:
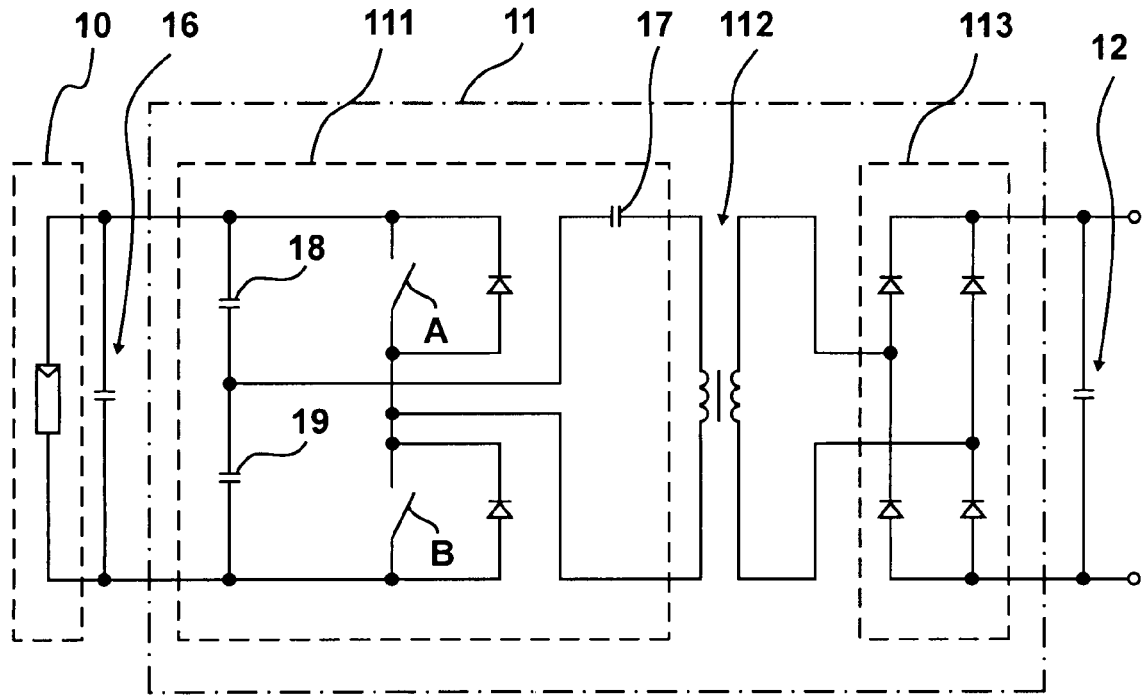
Figure 7:
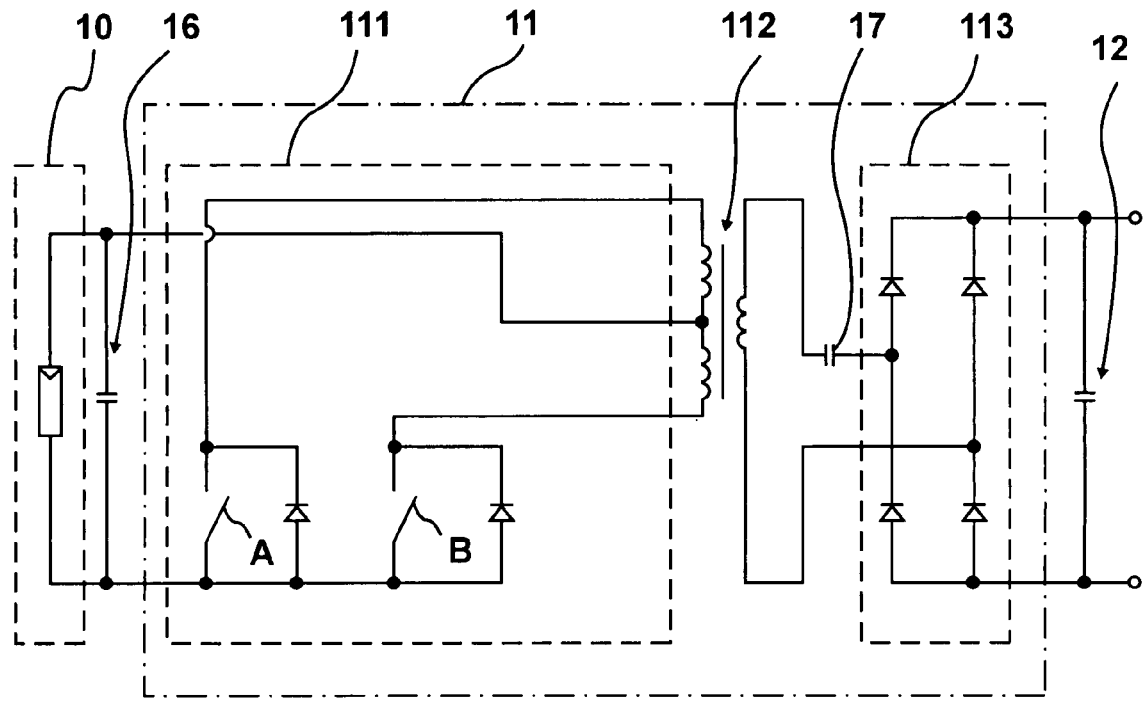
Figure 8:
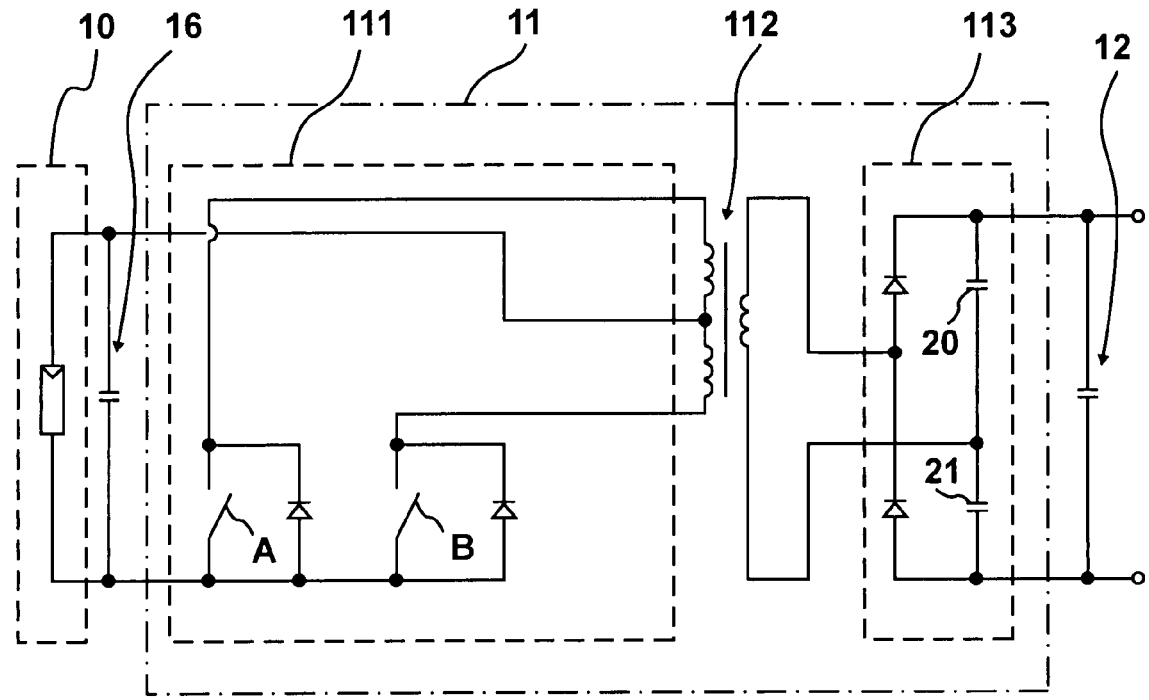

FIG. 1 shows a schematic diagram of a preferred embodiment of the invention,

FIG. 2 shows a current/voltage diagram and characteristic lines of an energy source, FIG. 3 shows primary side current and voltage curves of a transformer of the device of the invention, FIG. 4 shows other primary side current and voltage curves of a transformer of the device of the invention, FIG. 5 shows a diagram of a preferred solution of the invention, FIG. 6 shows a diagram of a first implementation variant of the preferred solution of the invention, FIG. 7 shows a diagram of a second implementation variant of the preferred solution of the invention, FIG. 8 shows a diagram of a third implementation variant of the preferred solution of the invention.

DETAILED DESCRIPTION OF THE INVENTION

The fundamental function of the device 1 of the invention will be first explained referring to FIG. 1, reference being made to the FIGS. 5 through 7 as well.

The device 1 comprises a resonant converter or rather a resonant inverter 11 (DC/DC inverter) with a high-frequency inverter 111 and a high-frequency rectifier 113, both being connected together by a high-frequency transformer 112 connected therein between in order to provide for galvanic isolation. The converter or inverter 11 virtually is (without regen-capable inverter) a DC/DC converter and serves for voltage adaptation and galvanic isolation. The transformer 112 is disposed in the resonant inverter 11. A direct voltage output of the high-frequency rectifier 113 leads to a direct voltage intermediate circuit (intermediate circuit capacitor 12), as can be seen from FIG. 1. As the last stage, the device 1 has a regen-capable inverter 13 connected downstream of the direct voltage intermediate circuit (intermediate circuit capacitor 12).

An energy source, preferably a direct voltage source, more specifically a photovoltaic or solar generator 10, intended for delivering electrical energy to an alternating voltage network or an energy supply network 15, is connected to an input of the device 1. The resonant inverter 11 is connected directly downstream of the energy source. The output of the regen-capable inverter 13 is hereby connected to the mains 15, an appropriate mains filter 14 being preferably connected downstream of the regen-capable inverter 13.

The device 1 works as an adapter device 1 and adapts the voltage provided by the energy source or the solar generator 10 to the voltage and frequency conditions in the energy supply network 15 that has to be fed. The high-frequency inverter 111 converts the direct voltage of the solar generator into alternating voltage that is transformed through the high-frequency transformer 112 to the voltage level desired. On the secondary side of the transformer 112, the voltage is rectified by the rectifier 113.

The transformation ratio of the high-frequency transformer 112 ensures that, in an MPP range, i.e., at a point of the characteristic line at which the output of the generator is highest, the solar generator 10 has such a high voltage at the direct voltage intermediate circuit (intermediate circuit capacitor 12) that feeding the energy supply network 15 is possible.

FIG. 2 shows by way of example a typical set of characteristic curves of the solar generator 10. In the no-load state of the solar generator 10, the voltage of the generator 10 is at its highest. In the so-called MPP, the voltage is lower than at no-load. It is in this working point however that the highest energy yield is achieved so that the solar generator 10 should be operated durably in this point. With increasing temperature, i.e., within the course of the day or during prolonged operation of the solar generator, the characteristic line is displaced because solar cells of the generator 10 are subjected to heating. At the same solar irradiation condition, solar cells yield higher no-load voltage and also higher output when the temperature is not so high. Accordingly, the no-load voltage decreases with increasing heating, which is denoted by Tmin and Tmax (T=solar cell temperature). The MPP voltage is also displaced according to FIG. 2 so that the MPP range settles between Tmin and Tmax. The resonant inverter 11 comprises a resonant capacitor 17, as shown in FIG. 5.

In accordance with the invention, the resonant inverter 11 is always operated in the full resonant mode in the MPP range of the solar generator 10. FIG. 3 shows the typical curve of the transformer primary current I of the high-frequency transformer 112 as well as of its primary voltage U. While the resonant capacitor 17 is charge exchanged, an almost sinusoidal current flows through a primary winding of the transformer 112. It is preferred that the resonance frequency is thereby determined by the leakage inductance of the transformer 112 and by the resonant capacitor 17 and is adjusted so as to be higher than the clock frequency of the semi-conductor switches a-d or A, B of the resonant inverter 111. The resonant inverter 11 more specifically comprises two or four semi-conductor switches a, b, c, d, A, B, which are transistors in particular. The semi-conductor switches a, b, c, d, A, B of the resonant inverter 111 switch at the time when the current in the primary winding is almost zero. A switching loss minimum is thus ensured. After completion of the charge exchange process of the capacitor, a small residual current, namely the magnetization current, is still flowing. The transformer voltage is determined by superimposing the voltage at the intermediate circuit (intermediate circuit capacitor 12) in accordance with the transformation ratio and with the voltage above the resonant capacitor 17. The resonant capacitor 17 is charge exchanged during the sinusoidal current flow. The charge exchange process can be clearly traced in the transformer voltage (see FIG. 3). The transistors or semi-conductor switches a, b, c, d or A, B of the resonant inverter 11 are operated in the MPP with pulse widths of approximately 30 and 50% of the period so that the voltage at the intermediate capacitor 12 will not fall below the minimum value needed for feeding the mains 15, even if the MPP voltage of the solar generator 10 adopts the minimum imposed by the system.

The voltage in the direct voltage intermediate circuit (intermediate circuit capacitor 12) must in particular be higher than 1.5 times the peak value of the conductor voltage in the energy supply network if the inverter 11 is a three-phase inverter or it must be higher than 1.5 times the peak value of the midpoint voltage in the energy supply network if the inverter is a one-phase inverter. If the voltage in the direct voltage intermediate circuit (intermediate circuit capacitor 12) is higher than this minimum voltage, the fine adjustment is performed by the one-phase or three-phase inverter.

In case the solar generator 10 is not loaded, the voltage can be much higher than in the MPP range, due to its high internal impedance. If in this operation condition, which may occur for example during start-up of the feeding device 1, the resonant inverter 11 is operated in the full resonant mode, the voltages in the direct voltage intermediate circuit (intermediate circuit capacitor 12) may exceed the voltages for which the semi-conductor switches e.g., D5 through D8 and the semi-conductor switches of the mains parts 13 of the adapter device 1 are devised.

If the voltage of the solar generator 10 exceeds the MPP voltage, the resonant inverter 11 is operated in what is referred to as the hard-switching mode of operation. In this operation point, the semi-conductor switches, e.g., a-d of the resonant inverter 11 or of the high-frequency inverter 111, hard-switch the transformer current off. One thus obtains the curves shown in FIG. 4 for the transformer primary current I and the transformer primary voltage U. If the voltages of the solar generator 10 are higher than the MPP voltage, the semi-conductor switches e.g., a-d of the inverter 11 or 111, are preferably operated at pulse widths of between zero and 50% so that the voltage at the intermediate circuit capacitor 12 will not exceed a maximum value given by the electric strength of semi-conductors, more specifically of semi-conductor switches of the regen-capable inverter 13, even if the voltage of the solar generator 10 is higher than the MPP voltage. The resonant inverter 11 may regulate the voltage in the direct voltage intermediate circuit (intermediate circuit capacitor 12). The losses in the resonant inverter 11 are thereby significantly higher than in the full resonant mode of operation. This drawback however may be accepted since the operation point with a hard-switching resonant inverter 11 is very limited in time and only occurs in the starting phase in which the energy source is not loaded. If the duty cycle is more than half the period of the resonance frequency of the oscillating circuit formed from resonant capacitor and transformer leakage inductance and is generally between 30% and 50%, the current formed would be sinusoidal. For shorter switch-on times the sinusoidal current is phase-controlled and one obtains through the transformer primary winding the current shown by way of example in FIG. 4. At the beginning of the current flow, the capacitor 17 is maximally charged. As the current increases, the capacitor 17 is charge exchanged. If the semi-conductor switches, e.g., a-d of the inverter 11 or 111, are switched off, the current flows through the diodes, e.g., D1-D4, confronting the semi-conductor switches, e.g., a d, in the associated commuting group, until it has decayed. The transformer voltage is again determined by superimposition of the voltage at the intermediate circuit (intermediate circuit capacitor 12) according to the transformation ratio and of the voltage at the resonant capacitor 17. If a pair of the confronting semi-conductor switches, e.g., a-d, of the resonant inverter 11 is respectively open, the capacitor 17 is charge-exchanged. The voltage change at the capacitor 17 is accordingly mapped in the transformer voltage. In the commuting phase after the active switches, e.g., a-d, have switched off and as long as the current flows through one of the diodes D1 through D4, a voltage peak is induced in accordance with the current flow of the falling flank. The voltage then drops to the level of the intermediate circuit voltage at the capacitor 12, multiplied with the transformation ratio of the transformer. In this phase, a residual current, the magnetization current of the transformer 112, flows through the secondary side diodes e.g., diodes D5-D8. Once this magnetization current has decayed, the transformer voltage is zero. The phase in which the transformer voltage is zero may also be obviated.

A preferred embodiment of the invention will be described in closer detail referring to FIG. 5.

A resonant inverter 11 in the form of a full-bridge circuit with the four semi-conductor switches a-d is mounted downstream of the solar generator 10 having a buffer capacitor 16 or of another DC source.

The full-bridge circuit is connected to the transformer 112 through the capacitor 17. The rectifier 113 is mounted downstream of the transformer 112. Together with the capacitor 17, the leakage inductance (not shown) of this transformer forms a series resonance. If the resonance frequency obtained is higher than the switching frequency of the switches of the full-bridge circuit, the switches a-d can be switched on and off without loss.

The high-frequency inverter 111 and the high-frequency transformer 112 form, together with the secondary side rectifier 113, a resonant converter circuit or the resonant inverter 11.

The intermediate circuit capacitor 12 and the regen-capable inverter 13 (not shown herein) are mounted downstream of the resonant inverter 11. As already shown in FIG. 1, the regen-capable inverter 13 is connected to the energy supply network 15 that has not been illustrated here via the mains filter 14 that has not been illustrated herein.

Due to the resonant converter circuit, the voltages at the capacitor 16 and the intermediate circuit capacitor 12 are hard-coupled. This means that, when subjected to load, the two voltages are proportional to each other according to the transformer's transformation ratio as long as the converter is operated in the full resonant mode.

At the beginning of the start-up phase, the voltage at the solar generator 10 is so high that full resonant operation is not possible. Then, the resonant inverter 11 is operated in the hard-switching mode.

FIG. 4 shows schematically the curve of the primary current in the hard-switching mode. The diagonally opposite semi-conductor switches a and d and b and c respectively of the inverter 11 and 111 respectively, are each opened simultaneously. They may be opened between zero and 50% of the period. If they are activated at 50%, the current obtained would be almost sinusoidal. For shorter switch-on times, the sinusoidal current is phase-controlled and the current obtained is as shown by way of example in FIG. 4. FIG. 4 also shows the voltage curve plotted above the primary winding of the transformer 112.

As soon as the intermediate circuit voltage at the intermediate circuit capacitor 12 has built up, the regen-capable inverter 13 begins to feed energy into the energy supply network 15. As a result, the energy source, i.e., the solar generator 10, is loaded. As a result, the voltage at the solar generator 10 drops. If, under the load, the voltage has dropped to such an extent that too high a voltage can no longer occur in the intermediate circuit capacitor 12, the resonant inverter 11 or 111 switches over to the full resonant mode. Then, the start-up process has come to an end.

FIG. 3 shows the schematic curve of the primary current of the transformer 112 in the resonant mode. Within half a period, an almost sinusoidal current forms. The resonant frequency, i.e., the current frequency, is adjusted so as to be higher than the clock frequency of the semi-conductor switches, e.g., a-d, of the inverter 11 or 111 respectively. The semi-conductor switches, e.g., a-d, of the inverter 11 or 111 respectively may be activated between approximately 30% and 50% of the period. The appropriate actuation is greater than half the period of the resonance frequency of the oscillating circuit consisting of the resonant capacitor 17 and the transformer's leakage inductance. As the current flows through the primary winding of the transformer 112, the capacitor 17 is charge exchanged. FIG. 3 also shows the voltage curve plotted above the primary winding of the transformer 112. This voltage is determined by the voltages at the direct voltage intermediate circuit (intermediate circuit capacitor 12) and at the resonant capacitor 17.

As a rule, it is necessary to transform the voltage if the resonant inverter 11 or 111 and the regen-capable inverter 13 are to be equipped with semi-conductor switches, e.g., a-d, of the same electric strength. The semi-conductor switches, e.g., a-d, in the resonant inverter 11 or 111 must be devised for the no-load voltage of the solar generator 10. The semi-conductor switches, e.g., a-d, in the regen-capable inverter 13 must be devised for the voltage at the intermediate circuit capacitor 12 that is obtained in the MPP in the full resonant mode. As a rule, transformation is necessary because, at a transformation of 1:1 or less in the MPP, the voltage obtained at the intermediate circuit capacitor 12 would be so low that mains electricity supply would not be possible.

In a dimensioning example, it is assumed that the electric strength of the semi-conductors is 1200 V and the voltage of the DC source or of the solar generator 10 ranges from 450 V to 900 V. If the transformation ratio is e.g., 1:1.33 and the minimum input voltage is 450 V, an intermediate circuit voltage of 600 V is still achieved at the capacitor 12. This voltage is the minimum voltage necessary to feed a three-phase 400 V low voltage network. If the DC source voltage is between 450 V and 675 V, the resonant inverter 11 can be operated in the full resonant mode without the voltage at the capacitor 12 exceeding 900 V. The DC source voltage range of between 450 V and 675 V accordingly is the MPP range of the DC voltage source. For voltages of between 675 V and 900 V of the DC source, the resonant inverter 11 is operated in the hard-switch mode so that the intermediate circuit voltage at the capacitor 12 will not exceed 900 V. Voltages of 675 V and 900 V only occur when the DC source is unloaded, that is to say in the no-load condition or in the start-up phase.

Accordingly, the regen-capable inverter 13 can be equipped with semi-conductor switches, e.g., a-d, that are suited for operation in the MPP in the full resonant mode of operation but that are not suited for operation in the no-load condition of the input voltage source. As a result, semi-conductor switches a-d and e.g., corresponding free-wheeling diodes having a lower off-state voltage and, as a result thereof, lower losses can be used. Furthermore, such semi-conductors are less expensive. The resonant inverter 11 may also be equipped with semi-conductor switches, e.g., a-d, of another electric strength than those used for the regen-capable inverter 13.

All the known semi-conductor switches capable of being switched off may be utilized as the switches, for example IGBT's, MOSFET's, GTO's. A first implementation variant of the embodiment shown in FIG. 5 is illustrated in FIG. 6. The inverter 11 or the high-frequency inverter 111 is here implemented as a half-bridge circuit with two semi-conductor switches A and B. Beside the capacitor 16, there is also provided a connection in series of two additional capacitors 18 and 19 with a centre tap. The resonant circuit is formed by the leakage inductance of the transformer 112 and the capacitance of the capacitors 17, 18 and 19. If designed accordingly, the additional capacitor 17 may be obviated. Then, the resonant capacitance is only formed by the capacitors 18, 19 of the half-bridge.

The fundamental function of the circuit as shown in the FIGS. 1 or 5 remains unchanged. This variant however only needs two semi-conductor switches. It does not need any transformer with a primary side centre tap.

Another implementation variant of the invention is shown in FIG. 7. Here, the resonant converter 11 is implemented on the primary side as a centre tap connection with two semi-conductor switches A and B. In this case, the resonant capacitor 17 is disposed on the secondary side of the transformer 112.

In this implementation variant, semi-conductor losses are minimized on the primary side of the transformer 112. For this purpose, semi-conductor switches A and B having a higher off-state capacity must be utilized.

The fundamental function of the circuit as shown in the FIGS. 1 or 5 remains again unchanged. This variant also only needs two semi-conductor switches and is suited for low-source voltages. As contrasted to the embodiment above, it requires a transformer with a primary side centre tap.

A fourth example of the invention is shown in FIG. 8. The resonant inverter 11 is here implemented on the primary side as a centre tap connection with semi-conductor switches A and B. Two resonant capacitors 20, 21 connected in series are provided here. The resonant capacitors 20, 21 are disposed as a constituent part of the rectifier 113 in the form of a half-bridge circuit on the secondary side. In principle, and as already shown in FIG. 7, an additional resonant capacitor 17 can be inserted in series with the secondary winding of the high-frequency transformer 112.

In this implementation variant, the semi-conductor losses are minimized on the primary side of the transformer. For this purpose, semi-conductor switches A and B having a higher off-state capacity must be utilized.

The fundamental function of the circuit as shown in the FIGS. 1 or 5 remains again unchanged. This variant only needs two semi-conductor switches and is suited for low-source voltages. It requires a transformer with a primary side centre tap.

Instead of a solar generator 10, another energy source, preferably an energy source with a variable source voltage and in, particularly with a high internal impedance may be utilized, for example a fuel cell, a battery, a wind power plant with a permanent-magnet generator, a combustion engine with a permanent-magnet generator or a water power plant with a permanent-magnet generator (PM-generator). High internal impedance in the sense of the invention is given if the non-load voltage changes by more than 20%, more specifically by more than 40%, with respect to an operation point to which a load is applied.

Alternatively, instead of one single resonant inverter, several inverters, more specifically several high-frequency inverters 111, may also be provided on the primary side on the transformer 112. These inverters are virtually mounted in parallel at the energy source and are connected to a common intermediate capacitor 12 on the secondary side with respect to the transformer 112. The discrete high-frequency inverters (111.1 through 111.n) are clocked at different times so that lower ripple current loads are generated in the energy source and in the intermediate circuit capacitor 12.

Also, what has not been shown, a leakage inductance of the transformer 112 can be complemented by one or several additional inductances in order to achieve the desired resonance frequency.

LIST OF NUMERALS 1 feeding device
10 solar generator
11 resonant inverter
12 direct voltage intermediate circuit
13 regen-capable inverter
14 mains filter
15 energy supply network
16 buffer capacitor
17 resonant capacitor
18, 19 further capacitors
20, 21 resonant capacitors
111 high-frequency inverter
112 high-frequency transformer
113 high-frequency rectifier

I claim:

1. A device (1) for feeding electrical energy from an energy source with variable source voltage into an electric power supply network (15), said device (1) including a transformer (112) for galvanic isolation, a resonant inverter (11) with semi-conductor switches (a-d; A, B), one or several resonant capacitors (17; 18, 19; 20, 21) and one rectifier (113), characterized in that the device (1) does not comprise a boost chopper or a buck chopper, and that the resonant inverter (11) is operated in a full resonant mode if an operating voltage is in a maximum power operation point (MPP) that exists in normal operation, whereby in the maximum power point (MPP) the current from the transformer (112) is a current made from sinusoidal half-waves, and the resonant inverter (11) is operated in a hard-switching mode if the voltages exceed the maximum operation point (MPP), so that the current from the transformer (112) comprises sine-wave portions, whereby the hard-switching mode only occurs in a start-up phase.

2. The device as set forth in claim 1, characterized in that, in the operation point (MPP), the semi-conductor switches (a-d; A, B) of the resonant inverter (111) are operated with a duty cycle that is more than half a period of a resonance frequency of an oscillating circuit comprising one resonant capacitor or several resonant capacitors and of a transformer leakage inductance, at pulse widths ranging between 30 and 50% of a period of a pulse frequency, so that a voltage at an intermediate circuit capacitor (12) will not fall below a minimum value needed for feeding the network (15), even if a voltage at the maximum power point (MPP) of the energy source adopts a minimum voltage value imposed by the device, and that, if the voltages of the energy source are higher than the maximum power point voltage, said semi-conductor switches are operated at pulse widths of between zero and 50% so that the voltage at the intermediate circuit capacitor (12) will not exceed a maximum value given by an electric strength of the semi-conductor switches (a-d, A, B) of a regen-capable inverter (13), even if the voltage of the energy source is higher than the (MPP) voltage.

3. The device as set forth in claim 1,
characterized in that semi-conductor switches of the same electric strength as semi-conductor switches (a-d; A, B) are used in the resonant inverter (11) and in the regen-capable inverter (13).

4. The device as set forth in claim 1,
characterized by an implementation such that, in the hard-switching operation above the operation point (MPP), a transformer current of the transformer (112) consists of sine-wave portions.

5. The device as set forth in claim 1,
characterized in that the transformer (112) is a high-frequency transformer (112) and is operated at a frequency that is higher than a frequency of the energy supply network (15).

6. The device as set forth in claim 1,
characterized in that a high-frequency inverter (111), which is part of the resonant inverter (11) and comprises the semi-conductor switches (a-d; A, B), which are performed as MOS transistors, IGBT's, or GTO's, is mounted upstream of the transformer (112).

7. The device as set forth in claim 2,
characterized in that the regen-capable inverter (13) is a one-phase or a three-phase inverter.

8. The device as set forth in claim 1,
characterized in that the resonant inverter (11) comprises a full bridge.

9. The device as set forth in claim 1,
characterized in that the resonant inverter (11) comprises a half-bridge.

10. The device as set forth in claim 9,
characterized in that the resonant inverter (11) is performed as a centre tap connection circuit.

11. The device as set forth in claim 1,
characterized in that the rectifier (113) is devised as a half-bridge.

12. The device as set forth in claim 1,
characterized in that the one or several resonant capacitors (17; 16, 19; 20, 21) are connected in series or in parallel with a resonant circuit with respect to a primary winding of the transformer (112).

13. A device for feeding electrical energy as set forth in claim 1,
characterized in that a resonant capacitor (20, 21) is connected in series or in parallel with a secondary winding of the transformer (112).

14. The device as set forth in claim 1,
characterized in that the the one or several resonant capacitors (18, 19) of a half-bridge located on the primary side of the transformer (112) are utilized as resonant capacitors.

15. The device as set forth in claim 1,
characterized in that the one or several resonant capacitors (20, 21) of a secondary side half-bridge are utilized as resonant capacitors.

16. The device as set forth in claim 1,
characterized in that a high-frequency inverter (111), the transformer (112) and the rectifier (113) form a resonant converter that is a DC/DC converter, a natural frequency formed by the one or more resonant capacitors (17; 18, 19; 20, 21) of a leakage inductance of the transformer (112) being higher than a switching frequency of the resonant inverter (11) in order to minimize switching losses in the semi-conductor switches (a-d; A, B) of the resonant inverter (11) as compared to a hard-switching mode of operation.

17. A device for feeding electrical energy as set forth in claim 1,
characterized in that a leakage inductance of the transformer (112) is complemented by one or several additional inductances in order to achieve a desired resonance frequency.

18. The device as set forth in claim 1,
characterized in that, on a primary side, several resonant inverters (11) are mounted in parallel at the energy source and, on a secondary side, are connected to a common intermediate circuit capacitor (12) discrete resonant inverters (11) being clocked at different times.

19. The device as set forth in claim 1,
characterized in that the resonant inverter (11) is connected to a regen-capable inverter (13).

20. A system with a device as set forth in claim 1 and with the energy source,
characterized in that the energy source is solar generator (10), a fuel cell, a battery, a wind power plant with a permanent-magnet generator, a combustion engine with a permanent-magnet generator or a water power plant with a permanent-magnet generator (PM-generator).

21. Use of a device as set forth in claim 1, in a public energy supply network supplying a plurality of consumers or an island network with one or several consumers.

22. A method of operating a device as set forth in claim 1, the energy source of which is a photovoltaic solar generator with at least one maximum power point (MPP) of a solar generator characteristic line, the resonant inverter (11) being operated in the full resonant mode in the MPP and in the hard-switching mode when the voltage exceeds the MPP.

23. The device as set forth in claim 1,
characterized in that high-performance semi-conductors capable of being switched off are mounted in parallel with the diodes D5 through D8 of the resonant rectifier (113) so that a circuit may be operated in both directions if the energy source is an energy accumulating device.

* * * * *